No. 730,176. Patented June 2, 1903.

UNITED STATES PATENT OFFICE.

JOKICHI TAKAMINE, OF NEW YORK, N. Y.

GLANDULAR EXTRACTIVE PRODUCT.

SPECIFICATION forming part of Letters Patent No. 730,176, dated June 2, 1903.

Original application filed November 5, 1900, Serial No. 35,546. Divided and this application filed January 14, 1903. Serial No. 138,969. (No specimens.)

*To all whom it may concern:*

Be it known that I, JOKICHI TAKAMINE, a subject of the Emperor of Japan, residing in the city of New York, county and State of New York, have invented and produced a new and useful Glandular Extractive Product, of which the following is a specification.

My invention relates to a new and useful product which possesses in a stable, permanent, and concentrated form the hemostatic blood-pressure-raising astringent and other physiological reactions and characteristics of the suprarenal capsules or glands, particularly those which affect the muscular system and muscular walls of the blood-vessels, said product being practically free from inert, deteriorating, or deleterious matter.

It has been known heretofore that the suprarenal glands possess hemostatic, blood-pressure-raising, and astringent properties, and various attempts have been made to utilize them. For instance, the glands have been desiccated and powdered and employed in this condition. The dried and powdered glands, as well as the glands in fresh condition, have been extracted with water and the aqueous extract utilized. Also attempts have been made to obtain the efficient constituents of the glands above mentioned in a more or less segregated condition. All these attempts to utilize the above-described properties of the glands have failed to produce a stable, efficient, pure, concentrated, and reliable product, uniform and permanent in its action and free from injurious and decomposing ingredients. For these reasons and in view of the danger of introducing impurities and injurious substances into the human system it has hitherto been impracticable to employ the valuable properties of the glands, and the medical and surgical arts have been deprived of an efficient and valuable agent.

My invention renders available for use the above-mentioned properties of the suprarenal glands in a stable, pure, and concentrated form without danger of bringing deleterious and injurious bodies into contact with or introducing such bodies into the patient's system.

The present application is a division of a former application, Serial No. 35,546, filed November 5, 1900, in which is described a process for obtaining the herein-described product. Other applications—viz., Serial Nos. 37,729 and 37,730, filed November 26, 1900, and Serial No. 156,746, filed May 12, 1903—disclose other processes for obtaining the product forming the subject of the present invention.

According to my application Serial No. 35,546, of November 5, 1900, the product is obtained as follows: The clean suprarenal glands or capsules of animals—such as cattle, sheep, &c.—are disintegrated by any suitable means and a fluid extract is made therefrom by treatment of the disintegrated glands with about an equal weight of water and steeping at a temperature of about 60° to 75° centigrade for a period of about five to ten hours in a suitable vessel, preferably avoiding contact with atmospheric air, which can be to a great extent accomplished by a film of fat floating on top of the liquid or may be done by passing a slow current of hydrogen or carbon dioxid into the top part of the vessel. The film of fat referred to may be the fat associated with the glands in their natural condition. The object of this protective film or atmosphere is to prevent the oxidation of the extract. At the latter part of the steeping the temperature of the mixture may be raised from 85° to 100° centigrade. The mass is now strained, and the residue is pressed to squeeze out as much liquid as possible. The residue thus pressed out is steeped again with the least amount of water to cover the mass for several hours at the same temperature as above. The two extracts thus obtained are mixed and the mixture is cooled rapidly and the solidified fat removed. The liquid is now evaporated at a low temperature, preferably in a vacuum-pan, admitting, if necessary, a small quantity of hydrogen or carbon dioxid to replace air and to prevent oxidation. The liquid is evaporated until it becomes one-fifth to one-seventh of the original volume. To this concentrated solution two to three times its own volume of alcohol is added, so that the mixture will contain about sixty per cent. of alcohol, by volume. This addition of alcohol will precipitate non-active bodies, such as albuminoids, phosphates, and other mineral salts. It is then filtered and the filtrate distilled under vacuum to separate the alcohol, which is condensed and recovered in a suitable manner. The liquid is thus concentrated to such a degree that its specific gravity becomes 1.05 to 1.15, and caustic-soda or caustic-potash solution of about thirty per cent. strength is gradually and carefully added, taking due precaution not to overheat the liquid until the mixture shows a strong alkaline reaction. At this stage an amount of ammonium chlorid corresponding to one-half of the molecular weight of the caustic soda used is added and made to dissolve in the liquid. The solution is now allowed to remain in a cool place from twelve to fourteen hours, when the formation of a crystalline substance will be observed in this liquid, and its formation will be completed during that space of time. This crystalline substance will be found to consist of conglomerations of microcrystals. The quantity of caustic alkali to be added is regulated so that the alkali added will dissolve or redissolve the product formed, the quantity of alkali used being about 0.3 to 0.4 per cent., in weight, of the original gland used, and the amount of ammonium chlorid to be added is regulated in such a way that it will nullify the excess of the caustic alkali used, it being understood that the solvent action is due to fixed caustic-alkali and is not exerted by ammonia. The caustic alkali used may be any of the substances generally recognized as of a caustic-alkaline nature, as the hydrates of sodium, potassium, calcium, barium, and the like.

Instead of adding ammonium chlorid after the addition of the caustic alkali carbon dioxid may be passed into the solution. Then the formation of white silky microcrystals will be observed. The carbon dioxid is passed until no more precipitate is formed. This substance is filtered out and washed with water and alcohol and dried. This constitutes the product of my invention.

In order to further purify the substance, the following methods may be used, namely: The crude mass is dissolved in the least amount possible of weak acid, such as acetic or hydrochloric acid. The solution is then filtered, preferably after the addition of strong alcohol to precipitate mineral matters and other impurities and inert substances, if neccessary, and caustic ammonia or alkaline carbonates are added, so as to make the solution strongly alkaline. The substance will then separate out in much purer form than before, being practically free from inorganic matter. This process of purification may be repeated until the substance becomes quite pure, or the crude substance may be dissolved in the least possible amount of weak caustic alkali, filtered, if necessary, and carbon dioxid then passed into the solution. The substance will precipitate out in a white crystalline condition. The purification may be repeated as often as necessary.

The substance or product is difficultly soluble in water, dissolving more readily in hot water than in cold, and this property can be utilized for its recrystallization. For this purpose the substance is heated with water slowly to the boiling-point in presence of an excess of the substance. The liquid is filtered while hot, and the filtrate on cooling will deposit the substance in fine crystalline form. It will crystallize out in tabular form or in triangular prism or fine needle form. The substance is readily soluble in weak alkalies or in weak acids, organic as well as inorganic. With acids the substance forms salts corresponding to the acids. The salts are with difficulty crystallized, for the reason that they are hygroscopic. Salts of the substance possess the same physiological properties as the substance itself and constitute new substances not claimed herein, but claimed in another application, Serial No. 156,747, filed May 12, 1903.

My new product is perfectly stable when pure and dry and can therefore be kept for years without deterioration, thus affording a permanent and reliable form embodying the valuable properties of the suprarenal glands in a highly-concentrated and powerful condition. The substance may be kept in the solid condition or in the form of a solution. To illustrate its properties, the following instances are cited: A drop of a solution of my product of a strength of from one one-thousandth to one ten-thousandth will blanch normal conjunctiva within a minute. An aqueous solution of one one-thousandth water shows an approximately equal strength with a fresh aqueous extract of fresh glands in the proportion of eight parts of the glands to ten of water. An intravenous injection of the substance into an animal system produces a powerful action upon the muscular system in general, more especially upon the muscular walls of the blood-vessels, causing an enormous rise of blood-pressure.

The substance in its crystalline condition assumes a variety of forms, which is one of its characteristics. Among the forms which it assumes are polygonal prisms, fine needles, rhombic plates, boat or leaf shaped, conglomerations of needles, and dumb-bell shaped. In color the substance is whitish and has a melting-point of about 207° centigrade. Among its chemical characteristics may be enumerated the following: Toward the usual acid and alkaline test reageants its aqueous solution exhibits an alkaline reaction. This is in distinction to the condition in which the substance exists in the glands, where it is either neutral or of an acid reaction. With ferric salts the substance gives a characteristic and beautiful green coloration. An excess of this reageant, however, destroys the green color. If when the green coloration exists the solution be rendered alkaline, a beautiful rose or carmine-red color is produced. With iodin-water a red coloration is given. While the formula of the substance is not yet fixed positively, present determinations show it to be approximately $C_{10}H_{15}NO_3$.

The substance is not precipitated by the usual alkaloid reagents, such as mercury potassium iodid, picric acid, tannic acid, phosphomolybdic acid, phosphotungstic acid, mercuric chlorid, lead acetate, potassium bichromate, platinum chlorid, potassium cadmium iodid, potassium bismuth iodid, &c.

The substance possesses powerful reducing properties, reducing gold and silver salts with great energy, particularly the former, the reaction upon the new product being to give it a beautiful rose-red color.

The substance may be kept in solid form or in solution, and where in the claims I have used the term "substance" I desire it to be understood as referring to either the solid or solution form of the substance, except when such signification would be plainly inconsistent with the terms of a particular claim.

While other characteristics and properties of the substance might be given, those mentioned above are sufficient to fully identify the substance.

Although the substance may be produced by the process herein described or the processes herein referred to, the present invention is not concerned with any particular process of production, but is for the product, however obtained.

Having thus described my invention, what I claim as new therein, and desire to secure by Letters Patent, is—

1. A substance possessing the herein-described physiological characteristics and reactions of the suprarenal glands in a stable and concentrated form, and practically free from inert and associated gland-tissue.

2. A substance possessing the herein-described physiological characteristics and reactions of the suprarenal glands in a stable and concentrated form, practically free from inert and associated gland-tissue, and having a whitish color when in a dry or solid condition.

3. A crytalline substance possessing the herein-described physiological characteristics and reactions of the suprarenal glands in a stable and concentrated form, and practically free from inert constituents.

4. A substance possessing the herein-described physiological characteristics and reactions of the suprarenal glands in a stable and concentrated form, having a whitish color and a crystalline form when in a dry or solid condition, and melting at about 207° centigrade.

5. A substance in the form of powder possessing the herein-described physiological characteristics and reactions of the suprarenal glands, in stable and concentrated form, difficultly soluble in water at ordinary temperature, and readily soluble in acids or alkalies.

6. A crystalline substance possessing the herein-described physiological characteristics and reactions of the suprarenal glands, said substance having the property of crystallizing in a variety of forms.

7. A substance possessing the herein-described properties of the suprarenal glands, having a whitish color, difficultly soluble in water at ordinary temperature, soluble in acids and forming salts therewith, soluble in alkalies, and melting at about 207° centigrade.

8. A substance possessing the herein-described physiological characteristics and reactions of the suprarenal glands, having approximately the formula $C_{10}H_{15}NO_3$ and having an alkaline reaction.

9. A substance possessing the herein-described physiological characteristics and reactions of the suprarenal glands, practically free from inert and associated gland-tissue, and having an alkaline reaction.

10. A substance possessing the herein-described physiological characteristics and reactions of the suprarenal glands, practically free from inert and associated gland-tissue, difficultly soluble in water, and giving a green coloration with an aqueous solution of a ferric salt.

11. A substance possessing the herein-described physiological characteristics and reactions of the suprarenal glands, practically free from inert and associated gland-tissue, having an alkaline reaction and reducing properties.

12. A substance possessing the herein-described physiological characteristics and reactions of the suprarenal glands, practically free from inert and associated gland-tissue, having an alkaline reaction, giving a green coloration in reaction with ferric salts, and a red coloration with iodin.

13. A substance possessing the herein-described physiological characteristics and reactions of the suprarenal glands and which is not precipitated by the usual alkaloid test reagents.

14. A substance possessing the herein-described properties of the suprarenal glands, practically free from inert and associated gland-tissue, having an alkaline reaction, giving a green coloration in reaction with ferric salts and having reducing properties.

15. The herein-described substance possessing hemostatic, astringent and blood-pressure-raising properties having a whitish color and a crystalline form, difficultly soluble in water at ordinary temperature, soluble in acids or alkalies, possessing reducing properties, giving a green coloration in reaction with ferric salts and a red coloration in reaction with iodin.

16. A solution possessing the herein-described physiological characteristics and reactions of the suprarenal glands in concentrated and stable condition, and from which solution is obtained the herein-described substance free from inert and deteriorating matter by simply neutralizing or removing the solvent.

JOKICHI TAKAMINE.

Witnesses:
J. GREEN,
C. VON GRUEBER.